US009199221B2

(12) United States Patent
Sato et al.

(10) Patent No.: US 9,199,221 B2
(45) Date of Patent: Dec. 1, 2015

(54) EXHAUST GAS PURIFICATION CATALYST, AND EXHAUST GAS PURIFICATION CATALYST STRUCTURE

(75) Inventors: Takahiro Sato, Saitama (JP); Yunosuke Nakahara, Saitama (JP); Masato Machida, Kumamoto (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 14/344,912

(22) PCT Filed: Sep. 10, 2012

(86) PCT No.: PCT/JP2012/073072
§ 371 (c)(1),
(2), (4) Date: Mar. 14, 2014

(87) PCT Pub. No.: WO2013/039037
PCT Pub. Date: Mar. 21, 2013

(65) Prior Publication Data
US 2014/0243191 A1    Aug. 28, 2014

(30) Foreign Application Priority Data

Sep. 14, 2011 (JP) ................................. 2011-201029
Dec. 26, 2011 (JP) ................................. 2011-284546

(51) Int. Cl.
*B01J 23/89* (2006.01)
*B01J 21/02* (2006.01)
(Continued)

(52) U.S. Cl.
CPC ............. *B01J 23/892* (2013.01); *B01D 53/945* (2013.01); *B01J 21/02* (2013.01); *B01J 23/63* (2013.01);
(Continued)

(58) Field of Classification Search
CPC .......... B01J 21/02; B01J 21/04; B01J 23/745; B01J 23/75; B01J 23/755; B01J 2523/305; B01J 2523/31; B01J 2523/32; B01J 2523/84
USPC ................................................... 502/202, 207
IPC .................... B01J 21/02, 21/04, 23/745, 23/75, B01J 23/755, 2523/305, 2523/31, 2523/32, B01J 2523/84
See application file for complete search history.

(56) References Cited

U.S. PATENT DOCUMENTS 3,856,702 A * 12/1974 McArthur ..................... 502/204
3,856,705 A * 12/1974 McArthur ..................... 502/202
(Continued)

FOREIGN PATENT DOCUMENTS

JP    06-099069    4/1994
JP    07-171392    7/1995
(Continued)

OTHER PUBLICATIONS

International Search Report PCT/JP2012/073072 dated Nov. 13, 2012.
(Continued)

*Primary Examiner* — Patricia L Hailey
(74) *Attorney, Agent, or Firm* — Young & Thompson (57) ABSTRACT

Provided are an exhaust gas purification catalyst including a carrier containing substituted aluminum borate in which 2.5 to 11.5 at. % of aluminum atoms contained therein are substituted by Fe, Co, Ga, or Ni, and Pd supported on the carrier; and an exhaust gas purification catalyst product including a catalyst support made of a ceramic or metallic material, and a layer of the aforementioned exhaust gas purification catalyst and which is supported on the catalyst support.

6 Claims, 3 Drawing Sheets

(51) Int. Cl.
- B01J 23/63 (2006.01)
- B01J 23/745 (2006.01)
- B01J 35/04 (2006.01)
- B01J 35/10 (2006.01)
- B01J 37/00 (2006.01)
- B01J 37/02 (2006.01)
- B01D 53/94 (2006.01)
- B01J 23/74 (2006.01)

(52) U.S. Cl.
CPC .............. *B01J 23/745* (2013.01); *B01J 23/896* (2013.01); *B01J 23/8906* (2013.01); *B01J 35/04* (2013.01); *B01J 35/1014* (2013.01); *B01J 37/0036* (2013.01); *B01J 37/0215* (2013.01); *B01D 2255/1023* (2013.01); *B01D 2255/209* (2013.01); *B01D 2255/2092* (2013.01); *B01D 2255/20738* (2013.01); *B01D 2255/20746* (2013.01); *B01D 2255/20753* (2013.01); *B01D 2255/908* (2013.01); *B01J 23/74* (2013.01)

(56) References Cited

U.S. PATENT DOCUMENTS

| | | | | |
|---|---|---|---|---|
| 4,024,171 | A * | 5/1977 | McArthur | 518/715 |
| 4,034,061 | A * | 7/1977 | McArthur | 423/213.5 |
| 4,091,072 | A | 5/1978 | McArthur | |
| 4,645,753 | A * | 2/1987 | Zletz et al. | 502/202 |
| 4,755,497 | A * | 7/1988 | De Simone et al. | 502/202 |
| 5,084,259 | A * | 1/1992 | Satek et al. | 423/277 |
| 5,104,845 | A * | 4/1992 | Montag et al. | 502/202 |
| 5,264,407 | A * | 11/1993 | Satek et al. | 502/207 |
| 2010/0179358 | A1 | 7/2010 | Al-Hamed et al. | |

FOREIGN PATENT DOCUMENTS

| | | |
|---|---|---|
| JP | 08-281071 | 10/1996 |
| JP | 2002-370035 | 12/2002 |
| JP | 2010-527948 | 8/2010 |
| WO | 2012005375 | 1/2012 |

OTHER PUBLICATIONS

Takayuki Minegishi, et al., "Development of Nobel-Metal-Saving Catalyst Employing Borate Salt Carrier (3)", Proceedings, 108th Catalyst annual meetings, Sep. 13, 2011, p. 163 and an English translation of the relevant parts.

Masato Machida, et al., "Development of Oxoacid Salts as Support Materials Capable of Minimizing Loading of Precious Metals", Shokubai (Catalyst), Apr. 10, 2012, vol. 54, No. 3, pp. 160-166.

Takayuki Minegishi, et al., "Development of Nobel-Metal-Saving Catalyst Employing Borate Salt Carrier (2)", Proceedings, 107th Catalyst annual meetings, Mar. 18, 2011, p. 48.

Ayaka Imamura, et al., "Development of Nobel-Metal-Saving Catalyst Employing Borate Salt Carrier (4)", Proceedings, 109th Catalyst annual meetings, Mar. 10, 2012, p. 111.

Chinese Official Action—201280044887.3—Feb. 15, 2015.

Martin Fisch et al—Crystal-chemistry of mullite-type aluminoborates Al18B4O33 and Al5BO9: A stoichiometry puzzle—Journal of Solid State Chemistry 184, pp. 70-80. Oct. 21, 2010.

Extended European search report, dated Aug. 6, 2015; Application No. 12831866.4.

\* cited by examiner

EXHAUST GAS PURIFICATION CATALYST, AND EXHAUST GAS PURIFICATION CATALYST STRUCTURE

TECHNICAL FIELD

The present invention relates to an exhaust gas purification catalyst, and to an exhaust gas purification catalyst product. More particularly, the present invention relates to an exhaust gas purification catalyst which exhibits excellent oxygen storage capacity, and exhibits excellent exhaust gas purification performance (in particular, excellent $NO_x$ removal performance under a rich condition) even after long-term use thereof at high temperature; and to an exhaust gas purification catalyst product including the exhaust gas purification catalyst.

BACKGROUND ART

Exhaust gas discharged from an internal combustion engine of, for example, an automobile contains toxic components such as hydrocarbons (HC), carbon monoxide (CO), and nitrogen oxides ($NO_x$). Hitherto, three-way catalysts have been used for removing such toxic components for detoxifying the exhaust gas.

Such a three-way catalyst includes a noble metal (e.g., Pt, Pd, or Rh) serving as a catalytically active component; a material such as alumina, ceria, zirconia, or oxygen-occluding ceria-zirconia composite oxide, serving as a carrier; and a catalyst support made of a ceramic or metallic material and having a shape of honeycomb, plate, pellet, etc.

The regulation of automobile exhaust gas has been more strict recently, which has increased the demand and price of Pt or Rh, serving as a main catalytically active component of internal engine, exhaust gas purification catalysts. Particularly, a change in price of Rh provides great effects, and thus demand has arisen for replacement of Rh with Pd, which among noble metals is inexpensive. Under such circumstances, efforts have been made toward reduction of exhaust gas purification catalyst production cost by use of relatively inexpensive Pd as a catalytically active component, and various means therefor have been proposed (see, for example, Patent Documents 1, 2, and 3). Also, there has been proposed a catalyst containing aluminum borate as a carrier; specifically, a catalyst which exhibits improved gas diffusibility and is produced by causing a catalyst component to be supported on a powder compact containing a powdery material having hollow portions therein and covered with aluminum borate whiskers (see Patent Document 4).

PRIOR ART DOCUMENT

Patent Document

Patent Document 1: Japanese Patent Application Laid-Open (kokai) No. H06-099069
Patent Document 2: Japanese Patent Application Laid-Open (kokai) No. H07-171392
Patent Document 3: Japanese Patent Application Laid-Open (kokai) No. H08-281071
Patent Document 4: Japanese Patent Application Laid-Open (kokai) No. 2002-370035

SUMMARY OF THE INVENTION

Problems to be Solved by the Invention

However, as has been reported, sintering of Pd in a high-temperature reducing atmosphere impairs exhaust gas purification performance. Therefore, suppression of Pd sintering is necessary for designing future catalysts containing a reduced amount of a noble metal. Meanwhile, since aluminum borate whiskers have an acicular shape and thus have a small specific surface area, a catalyst employing the whiskers inevitably involves aggregation of noble metal particles after having been subjected to high-temperature conditions; i.e., the catalyst poses a problem in terms of durability.

An object of the present invention is to provide an exhaust gas purification catalyst which exhibits excellent oxygen storage capacity, and exhibits excellent exhaust gas purification performance (in particular, excellent $NO_x$ removal performance under a rich condition) even after long-term use thereof under high-temperature conditions.

Means for Solving the Problems

In order to achieve the aforementioned object, the present inventors have conducted extensive studies, and as a result have found that when a substituted aluminum borate compound—in which a portion of aluminum atoms contained therein having excellent heat resistance and a cage-like structure are substituted by, for example, Fe, Co, Ga, or Ni atoms (in particular, an Fe or Ni-substituted aluminum borate compound)—is employed as a carrier of Pd, the resultant catalyst exhibits oxygen storage capacity and exhibits considerably improved $NO_x$ removal activity under a rich condition, as compared with the case where non-substituted aluminum borate or La-stabilized alumina is employed as a carrier of Pd. The present invention has been accomplished on the basis of this finding.

The characteristics, production method, etc. of aluminum borate are described in, for example, Siba P. Ray, "Preparation and Characterization of Aluminum Borate," J. Am. Ceram. Soc., 75 [9], pp. 2605-2609 (1992).

Hitherto, aluminum borate has been represented by the formula $9Al_2O_3 \cdot 2B_2O_3$ ($Al_{18}B_4O_{33}$) derived on the basis of chemical analysis. However, Martin, et al., "Crystal-chemistry of mullite-type aluminoborates $Al_{18}B_4O_{33}$ and $Al_5BO_9$: A stoichiometry puzzle," Journal of Solid State Chemistry 184 (2011) 70-80 describes that aluminum borate is represented by the formula $Al_5BO_9$ ($5Al_2O_3 \cdot B_2O_3$, $Al_{20}B_4O_{36}$) (i.e., the formula $10Al_2O_3 \cdot 2B_2O_3$) derived on the basis of crystal structure analysis, and that aluminum borate can be represented by both the formulas $9Al_2O_3 \cdot 2B_2O_3$ ($Al_{18}B_4O_{33}$) and $Al_5BO_9$ ($5Al_2O_3 \cdot B_2O_3$, $Al_{20}B_4O_{36}$) (i.e., these are the same substance).

Therefore, the aluminum borate employed in the present invention includes one represented by the formula $10Al_2O_3 \cdot 2B_2O_3$ ($5Al_2O_3 \cdot B_2O_3$, $Al_{20}B_4O_{36}$) and one represented by the formula $9Al_2O_3 \cdot 2B_2O_3 (Al_{18}B_4O_{33})$.

Accordingly, the present invention provides an exhaust gas purification catalyst, characterized by comprising a carrier containing substituted aluminum borate in which 2.5 to 11.5 at. % of aluminum atoms contained therein are substituted by Fe, Co, Ga, or Ni; and Pd supported on the carrier. The aluminum borate employed in the present invention corresponds to aluminum borate in which the ratio of aluminum oxide to boron oxide is 10:2 to 9:2, and includes one represented by the formula $10Al_2O_3 \cdot 2B_2O_3$ ($5Al_2O_3 \cdot B_2O_3$, $Al_{20}B_4O_{36}$) and one represented by the formula $9Al_2O_3 \cdot 2B_2O_3$ ($Al_{18}B_4O_{33}$). The aluminum borate can be identified as aluminum borate represented by the formula $10Al_2O_3 \cdot 2B_2O_3$ through X-ray diffractometry. Also, the aluminum borate can be identified as aluminum borate represented by the formula $9Al_2O_3 \cdot 2B_2O_3$ ($Al_{18}B_4O_{33}$), since $9Al_2O_3 \cdot 2B_2O_3$ ($Al_{18}B_4O_{33}$) is also present in a standard chart of X-ray diffraction.

The present invention also provides an exhaust gas purification catalyst, characterized by comprising a carrier containing M-substituted aluminum borate represented by the formula $M_mAl_{20-m}B_4O_{36}$ (wherein M is Fe, Co, Ga, or Ni, and m is 0.5 to 2.3); and Pd supported on the carrier.

The present invention also provides an exhaust gas purification catalyst, characterized by comprising a carrier containing M-substituted aluminum borate represented by the formula $M_nAl_{18-n}B_4O_{33}$ (wherein M is Fe, Co, Ga, or Ni, and n is 0.45 to 2.07); and Pd supported on the carrier.

In the exhaust gas purification catalyst of the present invention, the carrier is preferably iron-substituted aluminum borate.

The present invention also provides an exhaust gas purification catalyst product, characterized by comprising a catalyst support made of a ceramic or metallic material; and a layer of the aforementioned exhaust gas purification catalyst and which is supported on the catalyst support.

Effects of the Invention

The exhaust gas purification catalyst of the present invention exhibits excellent oxygen storage capacity, and exhibits excellent exhaust gas purification performance (in particular, excellent $NO_x$ removal performance under a rich condition) even after long-term use thereof under high-temperature conditions.

MODES FOR CARRYING OUT THE INVENTION

The carrier employed in the exhaust gas purification catalyst of the present invention is substituted aluminum borate in which 2.5 to 11.5 at. % of aluminum atoms contained in aluminum borate are substituted by Fe, Co, Ga, or Ni. The substituted aluminum borate may be represented by the formula $M_mAl_{20-m}B_4O_{36}$ (wherein M is Fe, Co, Ga, or Ni, and m is 0.5 to 2.3), or the formula $M_nAl_{18-n}B_4O_{33}$ (wherein M is Fe, Co, Ga, or Ni, and n is 0.45 to 2.07).

In the substituted aluminum borate, when the substituted aluminum atom content of aluminum borate is less than 2.5 at. % (i.e., when the aforementioned m is less than 0.5 or the aforementioned n is less than 0.45), the resultant catalyst tends to exhibit insufficient oxygen storage capacity, and insufficient exhaust gas purification performance after long-term use thereof under high-temperature conditions. Meanwhile, when the substituted aluminum atom content of aluminum borate exceeds 11.5 at. % (i.e., when the aforementioned m exceeds 2.3 or the aforementioned n exceeds 2.07), an impurity phase (hematite phase in the case of Fe) tends to be formed so as to exceed a solid solution limit, or a noble metal tends not to be supported at high dispersion degree due to an extreme reduction in specific surface area.

The aforementioned M-substituted aluminum borate may be produced through, for example, the following method.

<Solid Phase Method>

Boric acid weighed so as to attain a specific proportion in M-substituted aluminum borate (formula: $M_nAl_{18-n}B_4O_{33}$) (i.e., a compound of interest) is dissolved in ion-exchanged water. Iron nitrate, cobalt nitrate, or gallium nitrate weighed so as to attain a specific proportion is mixed with and dissolved in the above-prepared solution. Thereafter, boehmite acetate sol weighed so as to attain a specific proportion is mixed with the resultant solution, and the mixture is stirred under heating. The resultant gel-like product is dried at about 120° C. for 12 hours or longer. The thus-dried product is fired in air at about 300° C. for about one hour, and is further fired at about 1,000° C. for about five hours, to thereby produce M-substituted aluminum borate.

Specifically, boric acid weighed so as to attain a specific proportion in iron-substituted aluminum borate ($Fe_1Al_{17}B_4O_{33}$) (i.e., a compound of interest) is dissolved in ion-exchanged water. Iron nitrate nonahydrate weighed so as to attain a specific proportion is mixed with and dissolved in the above-prepared solution. Thereafter, boehmite acetate sol weighed so as to attain a specific proportion is mixed with the resultant solution, and the mixture is stirred under heating. The resultant gel-like product is dried at 120° C. for 12 hours or longer. The thus-dried product is fired in air at 300° C. for one hour, and is further fired at 1,000° C. for five hours, to thereby produce iron-substituted aluminum borate.

<Reverse Coprecipitation Method>

Boric acid weighed so as to attain a specific proportion in M-substituted aluminum borate (formula: $M_nAl_{18-n}B_4O_{33}$) (i.e., a compound of interest) is dissolved in pure hot water. Aluminum nitrate weighed so as to attain a specific proportion and iron nitrate, cobalt nitrate, or gallium nitrate weighed so as to attain a specific proportion are mixed with and dissolved in the above-prepared solution. Subsequently, the resultant solution is added dropwise to an aqueous ammonium carbonate solution. The thus-obtained precipitate is filter-washed with pure water and then subjected to filtration, followed by drying at about 120° C. overnight. The thus-dried product is fired in air at about 300° C. for about one hour, and then further fired in air at about 1,000° C. for about five hours, to thereby produce M-substituted aluminum borate.

Specifically, boric acid weighed so as to attain a specific proportion in iron-substituted aluminum borate ($Fe_1Al_{17}B_4O_{33}$) (i.e., a compound of interest) is dissolved in ion-exchanged water. Aluminum nitrate nonahydrate and iron nitrate nonahydrate weighed so as to attain specific proportions are mixed with and dissolved in the above-prepared solution. Subsequently, the resultant solution is added dropwise to an aqueous ammonium carbonate solution. The thus-obtained precipitate is filter-washed with pure water and then dried at 120° C. for 12 hours or longer. Thereafter, the thus-dried product is fired in air at 300° C. for one hour, and then further fired in air at 1,000° C. for five hours, to thereby produce iron-substituted aluminum borate. No difference is observed between the iron-substituted aluminum borate prepared through this reverse coprecipitation method and the iron-substituted aluminum borate prepared through the aforementioned solid phase method.

The exhaust gas purification catalyst of the present invention includes the carrier containing the aforementioned M-substituted aluminum borate, and Pd supported on the carrier. Since Pd is supported on the aforementioned M-substituted aluminum borate, the exhaust gas purification catalyst exhibits excellent oxygen storage capacity, and exhibits excellent exhaust gas purification performance (in particular, excellent $NO_x$ removal performance under a rich condition) even after long-term use thereof under high-temperature conditions. The amount of supported Pd, as reduced to metallic Pd, is preferably 0.35 to 3 mass %, more preferably 0.4 to 2 mass %, on the basis of the mass of the carrier. When the amount of supported Pd, as reduced to metallic Pd, is less than 0.35 mass % on the basis of the mass of the carrier; i.e., when the absolute amount of the noble metal is small, durability may be impaired, whereas when the amount of supported Pd exceeds 3 mass %; i.e., when the amount of the noble metal is excessively large, the noble metal may fail to be supported at high dispersion degree.

The exhaust gas purification catalyst of the present invention may be produced through, for example, the following procedure: M-substituted aluminum borate produced through the aforementioned solid phase method or reverse coprecipitation method is mixed with a solution of a Pd compound (a soluble Pd compound such as Pd nitrate, Pd chloride, or Pd sulfate) so that the amount of supported Pd, as reduced to metallic Pd, is preferably 0.2 to 3 mass % on the basis of the mass of the carrier; and then the resultant mixture is subjected to evaporation to dryness, followed by firing at 450 to 650° C. No particular limitation is imposed on the solvent forming "solution" as described in the present specification, etc., so long as it can form a solution. Generally, water is employed as a solvent.

The exhaust gas purification catalyst product of the present invention includes a catalyst support made of a ceramic or metallic material, and a layer of the exhaust gas purification catalyst of the present invention and which is supported on the catalyst support. In the exhaust gas purification catalyst product, no particular limitation is imposed on the shape of the catalyst support made of a ceramic or metallic material, and the support is generally in the form of honeycomb, plate, pellet, etc. When the catalyst support is in the form of honeycomb, the amount of the exhaust gas purification catalyst supported on the catalyst support is preferably 70 to 200 g/L, more preferably 100 to 200 g/L. When the amount of the supported catalyst is less than 70 g/L; i.e., when the amount of the supported catalyst is insufficient, durability tends to be impaired. Examples of the material of the catalyst support include ceramic materials such as alumina ($Al_2O_3$), mullite ($3Al_2O_3 \cdot 2SiO_2$), and cordierite ($2MgO \cdot 2Al_2O_3 \cdot 5SiO_2$); and metallic materials such as stainless steel.

The exhaust gas purification catalyst product of the present invention may be produced through, for example, the following method. Specifically, a Pd compound solution is mixed with M-substituted aluminum borate (50 to 70 parts by mass, preferably 50 to 60 parts by mass), La-stabilized alumina (20 to 40 parts by mass, preferably 20 to 30 parts by mass), barium hydroxide (0 to 3 parts by mass, preferably 1 to 3 parts by mass), and an alumina binder (5 to 10 parts by mass), and the resultant mixture is subjected to wet grinding, to thereby prepare a slurry. In this case, these materials are mixed together so that the amount of supported Pd, as reduced to metallic Pd, is preferably 0.35 to 3 mass %, more preferably 0.4 to 2 mass %, on the basis of the mass of the carrier. The thus-prepared slurry is applied onto a catalyst support made of a ceramic or metallic material (preferably, a honeycomb-shaped catalyst support) through a widely known method so that the amount of the exhaust gas purification catalyst supported on the catalyst support is preferably 70 to 200 g/L, more preferably 100 to 200 g/L. Thereafter, drying and firing (at 450 to 650° C.) are carried out, to thereby produce the exhaust gas purification catalyst product including the catalyst support, and a layer of the exhaust gas purification catalyst supported on the catalyst support.

The present invention will next be described in detail with reference to Referential Examples, Examples, and Comparative Examples.

Referential Example 1

Iron-substituted aluminum borate ($Fe_1Al_{17}B_4O_{33}$) was prepared through the below-described solid phase method. Boric acid weighed so as to attain a specific proportion in the compound of interest was dissolved in ion-exchanged water. Iron nitrate nonahydrate weighed so as to attain a specific proportion was mixed with and dissolved in the above-prepared solution. Thereafter, boehmite acetate sol weighed so as to attain a specific proportion was mixed with the resultant solution, and the mixture was stirred under heating. The resultant gel-like product was dried at 120° C. for 12 hours or longer. The thus-dried product was fired in air at 300° C. for one hour, and was further fired at 1,000° C. for five hours, to thereby produce iron-substituted aluminum borate. The thus-produced iron-substituted aluminum borate exhibited an XRD pattern shown in FIG. 1.

Referential Example 2

Non-substituted aluminum borate ($A_{18}B_4O_{33}$) was prepared through the below-described solid phase method. Boric acid weighed so as to attain a specific proportion in the compound of interest was dissolved in ion-exchanged water. Thereafter, boehmite acetate sol weighed so as to attain a specific proportion was mixed with the above-prepared solution, and the mixture was stirred under heating. The resultant gel-like product was dried at 120° C. for 12 hours or longer. The thus-dried product was fired in air at 300° C. for one hour, and was further fired at 1,000° C. for five hours, to thereby produce non-substituted aluminum borate. The thus-produced non-substituted aluminum borate exhibited an XRD pattern shown in FIG. 1. This aluminum borate can be identified as aluminum borate represented by the formula $10Al_2O_3 \cdot 2B_2O_3$ through X-ray diffractometry.

The thus-produced product can also be identified as aluminum borate represented by the formula $9Al_2O_3 \cdot 2B_2O_3$ ($Al_{18}B_4O_{33}$), since $9Al_2O_3 \cdot 2B_2O_3$ ($Al_{18}B_4O_{33}$) is present in a standard chart of X-ray diffraction.

Figure 1:
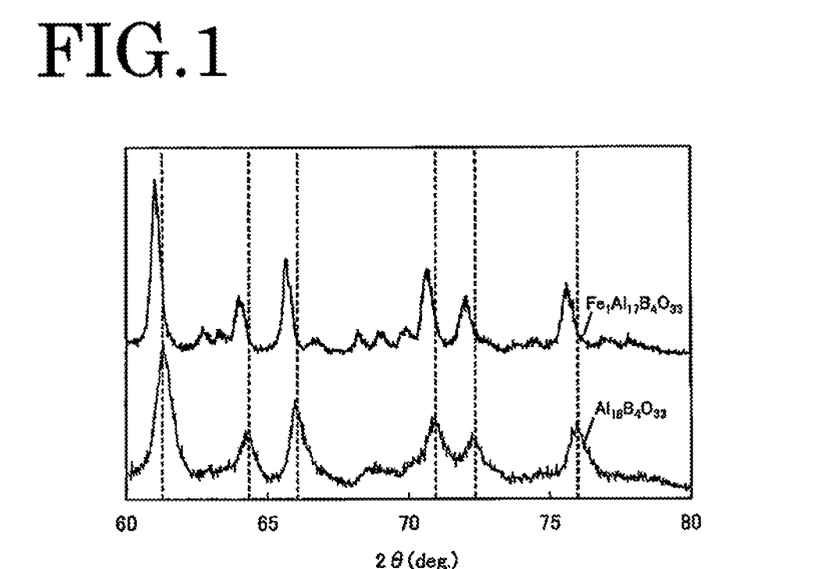
FIG. 1 shows an XRD pattern of iron-substituted aluminum borate produced in Referential Example 1, and an XRD pattern of non-substituted aluminum borate produced in Referential Example 2.

As is clear from FIG. 1 showing the XRD pattern of the iron-substituted aluminum borate and the XRD pattern of the non-substituted aluminum borate, peaks corresponding to the iron-substituted aluminum borate are shifted toward the low-angle side, as compared with peaks corresponding to the non-substituted aluminum borate. These data indicate that Al atoms contained in aluminum borate are substituted by Fe atoms.

Referential Example 3

Iron-substituted aluminum borate ($Fe_1Al_{17}B_4O_{33}$) was prepared through the below-described reverse coprecipitation method. Boric acid weighed so as to attain a specific proportion in the compound of interest was dissolved in ion-exchanged water. Aluminum nitrate nonahydrate and iron nitrate nonahydrate weighed so as to attain specific proportions were mixed with and dissolved in the above-prepared solution. Subsequently, the resultant solution was added dropwise to an aqueous ammonium carbonate solution. The thus-obtained precipitate was filter-washed with pure water and then dried at 120° C. for 12 hours or longer. Thereafter, the thus-dried product was fired in air at 300° C. for one hour, and then further fired in air at 1,000° C. for five hours, to thereby produce iron-substituted aluminum borate. No difference was observed between the iron-substituted aluminum borate prepared through this reverse coprecipitation method and the iron-substituted aluminum borate prepared through the solid phase method in Referential Example 1. The oxygen absorption/release behavior of the thus-prepared iron-substituted aluminum borate was examined on the basis of a change in mass during switching between a reducing atmosphere (1.4% $H_2$/He) and an oxidizing atmosphere (0.7% $O_2$/He) at a temperature of 800° C. The results are shown in FIG. 2.

Referential Example 4

The oxygen absorption/release behavior of the non-substituted aluminum borate produced in Referential Example 2 was examined on the basis of a change in mass during switching between a reducing atmosphere (1.4% $H_2$/He) and an oxidizing atmosphere (0.7% $O_2$/He) at a temperature of 800° C. The results are shown in FIG. 2.

Figure 2:
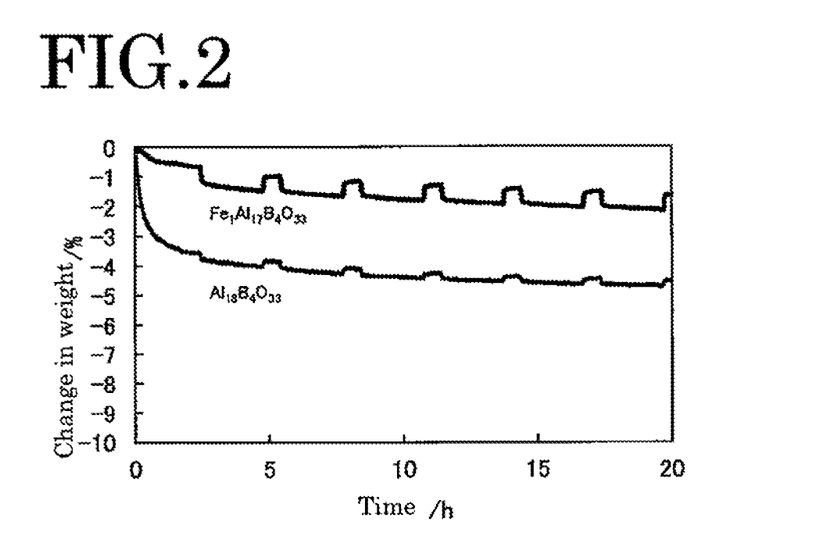
FIG. 2 shows the oxygen absorption/release behavior of iron-substituted aluminum borate produced in Referential Example 3, and the oxygen absorption/release behavior of non-substituted aluminum borate produced in Referential Example 4.

As is clear from the data on oxygen absorption/release behavior shown in FIG. 2, the percent change in mass during switching between the reducing atmosphere and the oxidizing atmosphere was 0.49% in the case of the iron-substituted aluminum borate, and 0.18% in the case of the non-substituted aluminum borate. Thus, the oxygen storage capacity of the iron-substituted aluminum borate was found to be about 2.7 times that of the non-substituted aluminum borate.

Example 1

The iron-substituted aluminum borate produced in Referential Example 3, serving as a carrier, was immersed in a palladium nitrate solution so that the amount of supported Pd, as reduced to metallic Pd, was 0.4 mass % on the basis of the mass of the carrier. Thereafter, the resultant mixture was subjected to evaporation to dryness at 120° C. overnight (for about 15 hours), and then fired in air at 600° C. for three hours, to thereby produce the exhaust gas purification catalyst of the present invention (0.4 mass % Pd/$Fe_1Al_{17}B_4O_{33}$).

Comparative Example 1

La-stabilized alumina, serving as a carrier, was immersed in a palladium nitrate solution so that the amount of supported Pd, as reduced to metallic Pd, was 0.4 mass % on the basis of the mass of the carrier. Thereafter, the resultant mixture was subjected to evaporation to dryness at 120° C. overnight (for about 15 hours), and then fired in air at 600° C. for three hours, to thereby produce an exhaust gas purification catalyst of Comparative Example 1 (0.4 mass % Pd/La-stabilized alumina).

Comparative Example 2

The non-substituted aluminum borate produced in Referential Example 2, serving as a carrier, was immersed in a palladium nitrate solution so that the amount of supported Pd, as reduced to metallic Pd, was 0.4 mass % on the basis of the mass of the carrier. Thereafter, the resultant mixture was subjected to evaporation to dryness at 120° C. overnight (for about 15 hours), and then fired in air at 600° C. for three hours, to thereby produce an exhaust gas purification catalyst of Comparative Example 2 (0.4 mass % Pd/$Al_{18}B_4O_{33}$).

Example 2

In the same manner as described in Example 1, there were produced 0.4 mass % Pd-supporting iron-substituted aluminum borate, 0.4 mass % Pd-supporting gallium-substituted aluminum borate, and 0.4 mass % Pd-supporting cobalt-substituted aluminum borate. The oxygen absorption/release behavior of each of the thus-produced three exhaust gas purification catalysts and the exhaust gas purification catalyst of Comparative Example 2 was examined on the basis of a change in mass during switching between a reducing atmosphere (1.4% $H_2$/He) and an oxidizing atmosphere (0.7% $O_2$/He) at a temperature of 800° C. The results are shown in Table 1.

Example 3

The procedure of Example 1 was repeated, except that nickel nitrate hexahydrate was employed in place of iron nitrate nonahydrate, to thereby produce 0.4 mass % Pd-supporting nickel-substituted aluminum borate. The oxygen absorption/release behavior of each of the thus-produced exhaust gas purification catalyst and the exhaust gas purification catalyst of Comparative Example 2 was examined on the basis of a change in mass during switching between a reducing atmosphere (1.4% $H_2$/He) and an oxidizing atmosphere (0.7% $O_2$/He) at a temperature of 800° C. The results are shown in Table 1.

TABLE 1

| Composition of exhaust gas purification catalyst | Change in mass, % |
|---|---|
| 0.4 mass % Pd/$Al_{18}B_4O_{33}$ | 0.24 |
| 0.4 mass % Pd/$Fe_1Al_{17}B_4O_{33}$ | 0.49 |
| 0.4 mass % Pd/$Ga_2Al_{16}B_4O_{33}$ | 0.48 |
| 0.4 mass % Pd/$Co_1Al_{17}B_4O_{33}$ | 0.45 |
| 0.4 mass % Pd/$Ni_1Al_{17}B_4O_{33}$ | 1.10 |

As is clear from the data shown in Table 1, the oxygen storage capacity of the iron, gallium, or cobalt-substituted aluminum borate was about twice that of the non-substituted aluminum borate, and the oxygen storage capacity of the nickel-substituted aluminum borate was about four times that of the non-substituted aluminum borate.

<Catalyst Performance Evaluation with Respect to Change in Air/Fuel Ratio>

Figure 3:
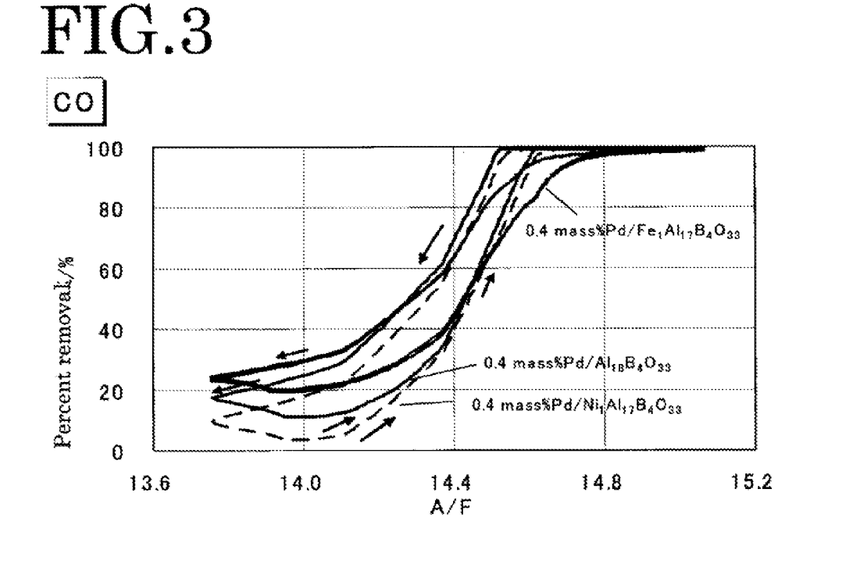
FIG. 3 is a graph showing the performance of an exhaust gas purification catalyst for CO with respect to a change in air/fuel ratio.
Figure 4:
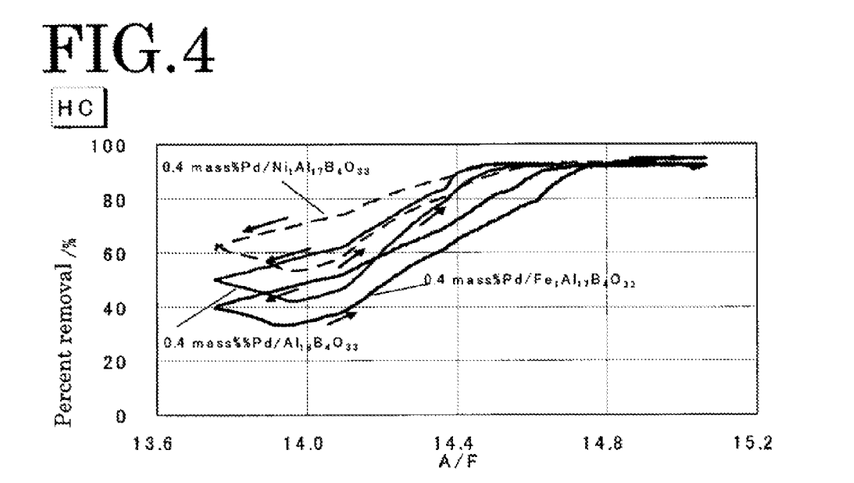
FIG. 4 is a graph showing the performance of an exhaust gas purification catalyst for HC with respect to a change in air/fuel ratio.
Figure 5:
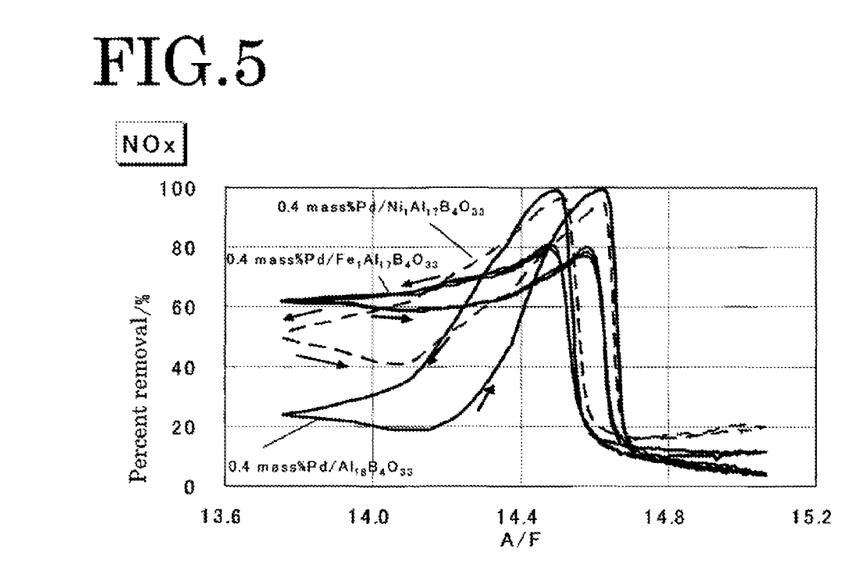
FIG. 5 is a graph showing the performance of an exhaust gas purification catalyst for $NO_x$ with respect to a change in air/fuel ratio.

Each of the exhaust gas purification catalyst produced in Comparative Example 2 (i.e., 0.4 mass % Pd-supporting non-substituted aluminum borate (0.4 mass % Pd/$Al_{18}B_4O_{33}$)), the exhaust gas purification catalyst produced in Example 1 (i.e., 0.4 mass % Pd-supporting iron-substituted aluminum borate (0.4 mass % Pd/$Fe_1Al_{17}B_4O_{33}$)), and the exhaust gas purification catalyst produced in Example 3 (i.e., 0.4 mass % Pd-supporting nickel-substituted aluminum borate (0.4 mass % Pd/$Ni_1Al_{17}B_4O_{33}$)) was treated in an air atmosphere containing water vapor (10%) at 900° C. for 25 hours. Thereafter, a change in catalytic activity of the exhaust gas purification catalyst (with respect to a change in air/fuel ratio) was evaluated in the following manner. Specifically, powder of the catalyst was placed in a reaction tube of a fixed-bed flow reactor, and a simulated exhaust gas; i.e., a gas simulating a complete combustion gas, composed of CO (0.51%), NO (500 ppm), $C_3H_6$ (1,182 ppmC), $O_2$ (0.1 to 0.9%), $H_2O$ (10%), and $N_2$ (balance), and exhibiting an air/fuel ratio (A/F) of 13.7 to 15.0 (in association with variation of $O_2$ concentration), was caused to flow through the reaction tube so as to attain a W/F of $5.0 \times 10^{-4}$ g·min·cm$^{-3}$. The composition of the outlet gas was measured at a temperature of 390° C. by means of a CO/HC/NO analyzer (HORIBA VA-3000) (scan speed: 0.0363/min). Measurement was carried out by varying $O_2$ concentration (i.e., from rich to lean, and then from lean to rich). The measurement results corresponding to CO, HC, and NO$_x$ are shown in FIGS. 3, 4, and 5, respectively. The percent removal of each gas component at 400° C. (η400) (A/F=13.7) is shown in Table 2.

TABLE 2

|  | CO | HC | NO$_x$ |
|---|---|---|---|
| 0.4 mass % Pd/Al$_{18}$B$_4$O$_{33}$ | 17 | 51 | 24 |
| 0.4 mass % Pd/Fe$_1$Al$_{17}$B$_4$O$_{33}$ | 19 | 42 | 60 |
| 0.4 mass % Pd/Ni$_1$Al$_{17}$B$_4$O$_{33}$ | 10 | 61 | 51 |

These data indicate that the exhaust gas purification catalyst of Example 1 (i.e., 0.4 mass % Pd-supporting iron-substituted aluminum borate (0.4 mass % Pd/Fe$_1$Al$_{17}$B$_4$O$_{33}$)) exhibits percent removal of CO and NO$_x$ (under a rich condition) higher than that of the non-substituted aluminum borate of the Comparative Example, and that the exhaust gas purification catalyst of Example 3 (i.e., 0.4 mass % Pd-supporting nickel-substituted aluminum borate (0.4 mass % Pd/Ni$_1$Al$_{17}$B$_4$O$_{33}$)) exhibits percent removal of HC and NO$_x$ higher than that of the non-substituted aluminum borate of the Comparative Example.

<BET, Pd Dispersion Degree, and Catalyst Performance Evaluation after Thermal Treatment>

Each of the exhaust gas purification catalyst produced in Comparative Example 2 (i.e., 0.4 mass % Pd-supporting non-substituted aluminum borate (0.4 mass % Pd/Al$_{18}$B$_4$O$_{33}$)) and the exhaust gas purification catalyst produced in Example 3 (i.e., 0.4 mass % Pd-supporting nickel-substituted aluminum borate (0.4 mass % Pd/Ni$_1$Al$_{17}$B$_4$O$_{33}$)) was treated in an air atmosphere containing water vapor (10%) at 900° C. for 25 hours. Thereafter, the specific surface area of each of the exhaust gas purification catalysts was measured through the BET method.

The degree of Pd dispersion of each catalyst was measured according to the CO pulse adsorption method (i.e., known technique) (T. Takeguchi, S. Manabe, R. Kikuchi, K. Eguchi, T. Kanazawa, S. Matsumoto, Applied Catalysis A: 293 (2005) 91). The degree of Pd dispersion is calculated by the following formula:

degree of Pd dispersion=the amount (by mole) of Pd corresponding to the amount of CO adsorbed/the total amount (by mole) of Pd contained in the catalyst of interest.

Subsequently, each purification catalyst was placed in a reaction tube of a fixed-bed flow reactor, and a simulated exhaust gas composed of NO (0.05%), CO (0.5%), $C_3H_6$ (0.039%), $O_2$ (0.4%), and He (balance) was caused to flow through the reaction tube so as to attain a W/F of $5.0 \times 10^{-4}$ g·min·cm$^{-3}$. The composition of the outlet gas was measured in a temperature range of 100° C. to 500° C. (temperature elevation from 100° C. to 500° C. at 10° C./min) by means of a CO/HC/NO$_x$ analyzer. On the basis of the thus-determined light-off performance of the catalyst, the temperature at which 50% of CO, HC, or NO$_x$ was removed (T50) was determined.

The results are shown in Table 3.

TABLE 3

|  | Specific surface area (m$^2$/g) | Pd dispersion (%) | T50 (° C.) CO | HC | NO$_x$ |
|---|---|---|---|---|---|
| 0.4 mass % Pd/Al$_{18}$B$_4$O$_{33}$ | 59 | 4 | 315 | 313 | 328 |
| 0.4 mass % Pd/Ni$_1$Al$_{17}$B$_4$O$_{33}$ | 54 | 7 | 302 | 317 | 302 |

These data indicate that the exhaust gas purification catalyst of the Example (i.e., 0.4 mass % Pd-supporting nickel-substituted aluminum borate (0.4 mass % Pd/Ni$_1$Al$_{17}$B$_4$O$_{33}$)) exhibits a specific surface area (after thermal treatment) comparable to that of the non-substituted catalyst, and Pd dispersibility higher than that of the non-substituted catalyst. The data also indicate that the exhaust gas purification catalyst of the Example (i.e., 0.4 mass % Pd-supporting nickel-substituted aluminum borate (0.4 mass % Pd/Ni$_1$Al$_{17}$B$_4$O$_{33}$)) exhibits higher low-temperature activity (i.e., lower T50 of CO, HC, and NO$_x$), as compared with the non-substituted catalyst.

Example 4

Iron-substituted aluminum borate (Fe$_1$Al$_{17}$B$_4$O$_{33}$) produced through the method described in Referential Example 1 (55 parts by mass), La-stabilized alumina (25 parts by mass), barium hydroxide (2 parts by mass), and an alumina binder (8 parts by mass) were added to a Pd nitrate solution, and the resultant mixture was subjected to wet grinding, to thereby prepare a Pd-containing slurry. In this case, the amount of the Pd nitrate solution was adjusted so that the amount of supported Pd was 0.7 mass % with respect to solid content. The thus-prepared slurry was applied to a ceramic honeycomb support at a coating amount of 100 g/L, followed by drying and firing, to thereby produce the honeycomb catalyst (exhaust gas purification catalyst product) of the present invention.

Comparative Example 3

La-stabilized alumina (88 parts by mass), barium hydroxide (2 parts by mass), and an alumina binder (8 parts by mass) were added to a Pd nitrate solution, and the resultant mixture was subjected to wet grinding, to thereby prepare a Pd-containing slurry. In this case, the amount of the Pd nitrate solution was adjusted so that the amount of supported Pd was 0.7 mass % with respect to solid content. The thus-prepared slurry was applied to a ceramic honeycomb support at a coating amount of 100 g/L, followed by drying and firing, to thereby produce a honeycomb catalyst (exhaust gas purification catalyst product) of the Comparative Example.

Comparative Example 4

Aluminum borate (Al$_{18}$B$_4$O$_{33}$) prepared through the solid phase method (55 parts by mass), La-stabilized alumina (25 parts by mass), barium hydroxide (2 parts by mass), and an alumina binder (8 parts by mass) were added to a Pd nitrate solution, and the resultant mixture was subjected to wet grinding, to thereby prepare a Pd-containing slurry. In this case, the amount of the Pd nitrate solution was adjusted so that the amount of supported Pd was 0.7 mass % with respect to solid content. The thus-prepared slurry was applied to a ceramic honeycomb support at a coating amount of 100 g/L, followed by drying and firing, to thereby produce a honeycomb catalyst (exhaust gas purification catalyst product) of the Comparative Example.

<Catalyst Performance Evaluation with Respect to Change in Air/Fuel Ratio>

Catalyst performance was evaluated by use of a simulated exhaust gas; i.e., a gas simulating a complete combustion gas, having a composition shown in Table 4 (containing CO, $CO_2$, $C_3H_6$, $H_2$, $O_2$, $NO_x$ $H_2O$, and $N_2$ (balance)), and exhibiting an air/fuel ratio (A/F) shown in Table 4. Each of the honeycomb catalysts was placed in an electric furnace maintained at 1,000° C., and thermally treated for 25 hours while a simulated exhaust gas having a composition and air/fuel ratio shown in Table 4 (50 s) and air (50 s) were periodically caused to flow through the furnace. The exhaust gas purification performance of the thus-treated honeycomb catalyst was evaluated.

TABLE 4

| | A/F | | | | | |
|---|---|---|---|---|---|---|
| | 14.2 | 14.4 | 14.5 | 14.6 | 14.7 | 14.8 |
| CO, % | 1.00 | 0.73 | 0.60 | 0.50 | 0.44 | 0.40 |
| $H_2$, % | 0.33 | 0.24 | 0.20 | 0.17 | 0.15 | 0.13 |
| $C_3H_6$, ppmC | 1200 | 1200 | 1200 | 1200 | 1200 | 1000 |
| NO, ppm | 500 | 500 | 500 | 500 | 500 | 500 |
| $O_2$, % | 0.35 | 0.41 | 0.45 | 0.46 | 0.55 | 0.60 |
| $CO_2$, % | 14.0 | 14.0 | 14.0 | 14.0 | 14.0 | 14.0 |
| $H_2O$, % | 10.0 | 10.0 | 10.0 | 10.0 | 10.0 | 10.0 |
| $N_2$ | Balance | Balance | Balance | Balance | Balance | Balance |

Each catalyst was evaluated under different λ (scanning) conditions; specifically, by use of different simulated exhaust gases (λ: 0.4 to 1.5) shown in Table 4. The simulated exhaust gas was caused to flow over each of the ceramic honeycomb catalysts of Example 4 and Comparative Examples 3 and 4 at an SV of 100,000 $h^{-1}$. The composition of the outlet gas was measured at 400° C. by means of a CO/HC/$NO_x$ analyzer, whereby the performance of each ceramic honeycomb catalyst was evaluated. The results corresponding to CO, HC, and $NO_x$ are shown in Tables 5, 6, and 7, respectively.

[Table 5]

TABLE 5

(percent removal of CO, %)

| | A/F | | | | | |
|---|---|---|---|---|---|---|
| | 14.2 | 14.4 | 14.5 | 14.6 | 14.7 | 14.8 |
| 0.4 mass % Pd/La-stabilized alumina | 33 | 45 | 77 | 97 | 98 | 98 |
| 0.4 mass % Pd/$Al_{18}B_4O_{33}$ | 34 | 46 | 72 | 96 | 98 | 99 |
| 0.4 mass % Pd/$Fe_1Al_{17}B_4O_{33}$ | 29 | 46 | 74 | 96 | 99 | 99 |

TABLE 6

(percent removal of HC, %)

| | A/F | | | | | |
|---|---|---|---|---|---|---|
| | 14.2 | 14.4 | 14.5 | 14.6 | 14.7 | 14.8 |
| 0.4 mass % Pd/La-stabilized alumina | 33 | 70 | 98 | 99 | 99 | 99 |
| 0.4 mass % Pd/$Al_{18}B_4O_{33}$ | 31 | 72 | 96 | 99 | 99 | 99 |
| 0.4 mass % Pd/$Fe_1Al_{17}B_4O_{33}$ | 41 | 87 | 98 | 99 | 99 | 99 |

TABLE 7

(percent removal of $NO_x$, %)

| | A/F | | | | | |
|---|---|---|---|---|---|---|
| | 14.2 | 14.4 | 14.5 | 14.6 | 14.7 | 14.8 |
| 0.4 mass % Pd/La-stabilized alumina | 21 | 22 | 91 | 98 | 10 | 9 |
| 0.4 mass % Pd/$Al_{18}B_4O_{33}$ | 26 | 26 | 68 | 95 | 10 | 9 |
| 0.4 mass % Pd/$Fe_1Al_{17}B_4O_{33}$ | 38 | 44 | 83 | 95 | 11 | 10 |

As is clear from the data shown in Table 7, the iron-substituted aluminum borate exhibits excellent $NO_x$ removal performance under a rich condition (i.e., 38% at A/F=14.2 and 44% at A/F=14.4), as compared with the cases of the La-stabilized alumina and the aluminum borate. Also, as is clear from the data shown in Table 6, the iron-substituted aluminum borate exhibits excellent HC removal performance under a rich condition (i.e., 41% at A/F=14.2 and 87% at A/F=14.4), as compared with the cases of the La-stabilized alumina and the aluminum borate. Conceivably, when a portion of 18 aluminum atoms (preferably, an average of 0.5 to 2 aluminum atoms) per molecule of aluminum borate are substituted by Fe atoms, oxygen storage capacity is improved, which leads to improvement of performance under a rich condition.

The invention claimed is:

1. An exhaust gas purification catalyst, characterized by comprising a carrier containing substituted aluminum borate in which 2.5 to 11.5 at. % of aluminum atoms contained therein are substituted by Ni; and Pd supported on the carrier.

2. An exhaust gas purification catalyst product, characterized by comprising a catalyst support made of a ceramic or metallic material; and a layer of an exhaust gas purification catalyst as recited in claim 1, which is supported on the catalyst support.

3. An exhaust gas purification catalyst, characterized by comprising a carrier containing M-substituted aluminum borate represented by the formula $M_mAl_{20-m}B_4O_{36}$ (wherein M is Ni, and m is 0.5 to 2.3); and Pd supported on the carrier.

4. An exhaust gas purification catalyst product, characterized by comprising a catalyst support made of a ceramic or metallic material; and a layer of an exhaust gas purification catalyst as recited in claim 3, which is supported on the catalyst support.

5. An exhaust gas purification catalyst, characterized by comprising a carrier containing M-substituted aluminum borate represented by the formula $M_nAl_{18-n}B_4O_{33}$ (wherein M is Ni, and n is 0.45 to 2.07); and Pd supported on the carrier.

6. An exhaust gas purification catalyst product, characterized by comprising a catalyst support made of a ceramic or metallic material; and a layer of an exhaust gas purification catalyst as recited in claim 5, which is supported on the catalyst support.

* * * * *